Dec. 11, 1934.   E. J. PILBLAD ET AL   1,983,705
TIRE AND TUBE REPAIR UNIT
Filed July 8, 1931    7 Sheets-Sheet 4

Dec. 11, 1934.  E. J. PILBLAD ET AL  1,983,705
TIRE AND TUBE REPAIR UNIT
Filed July 8, 1931   7 Sheets-Sheet 6
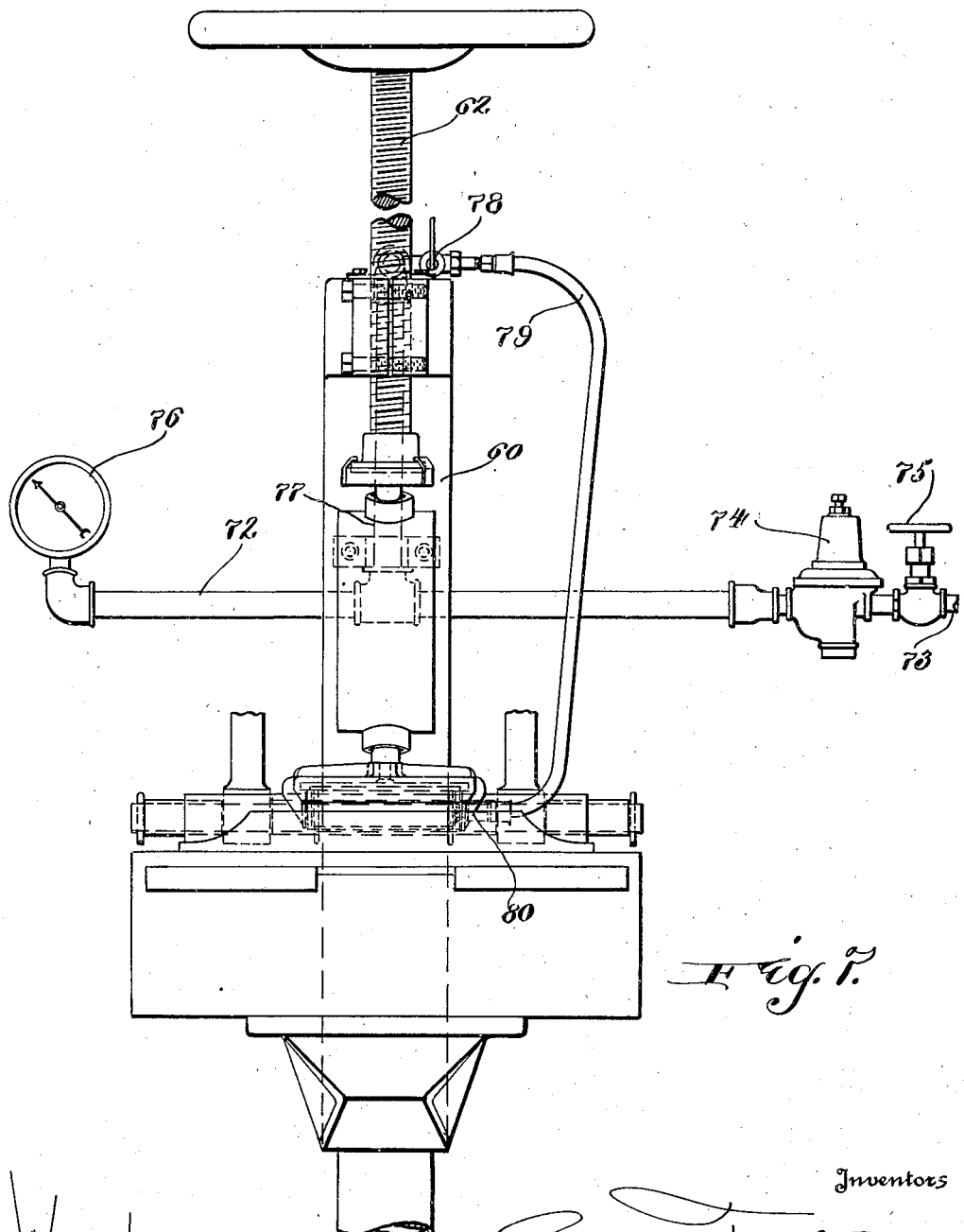

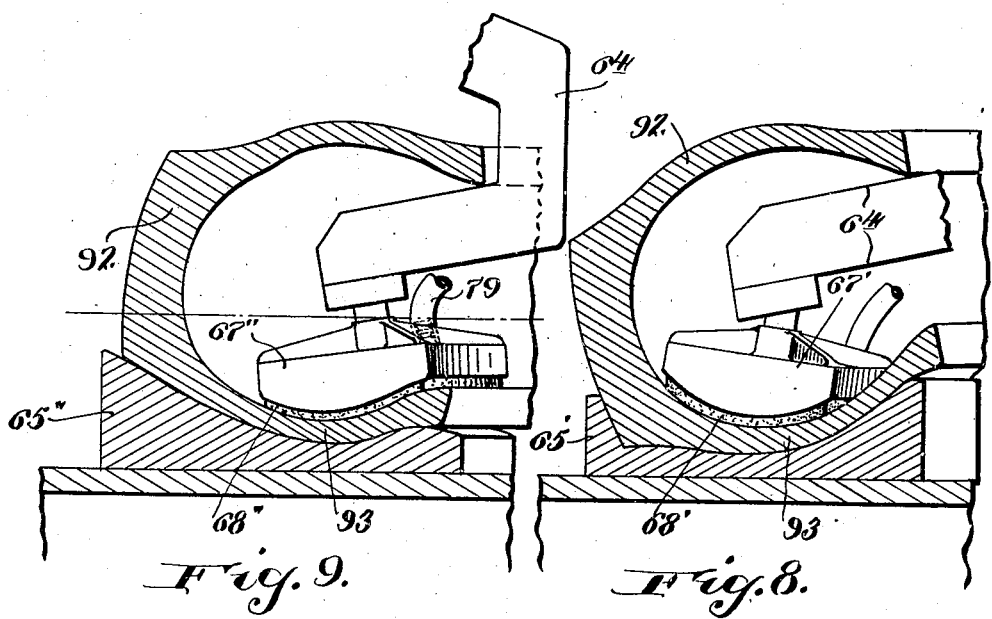
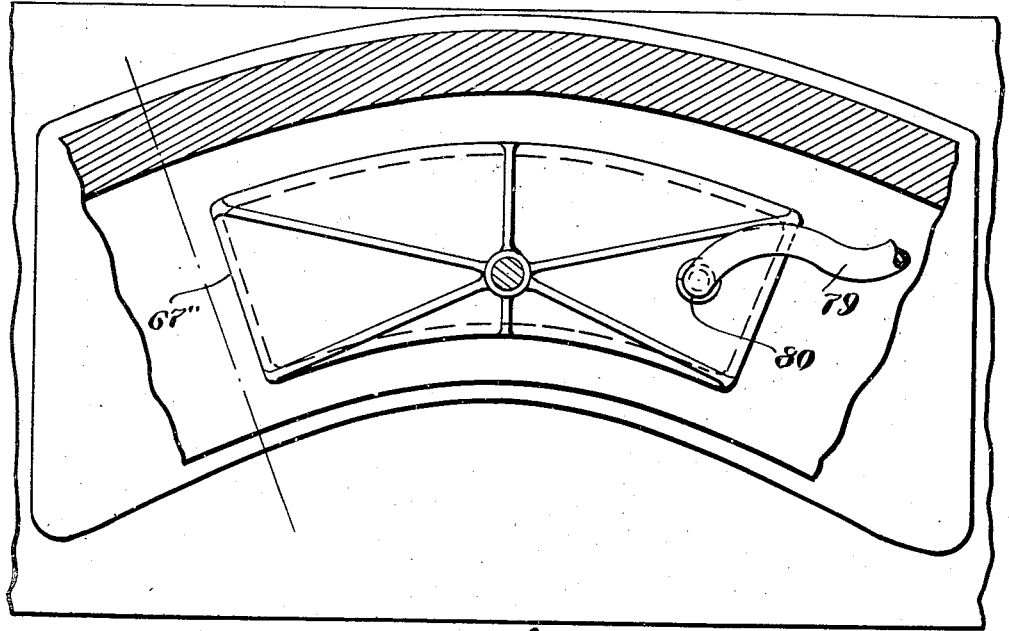

Patented Dec. 11, 1934

1,983,705

UNITED STATES PATENT OFFICE 1,983,705

TIRE AND TUBE REPAIR UNIT

Eric J. Pilblad, Nassau County, N. Y., and Edward Fetter, Baltimore, Md., assignors, by mesne assignments, to Gabriel Pneumatic Vulcanizer, Inc., a corporation of Ohio Application July 8, 1931, Serial No. 549,414

6 Claims. (Cl. 18—18)

The invention relates to repair apparatus for the inner tubes and casings of pneumatic tires for use in mending or repairing injuries, punctures, ruptures and the like by vulcanization. In accordance with the improvement pneumatic pressure is applied directly to the tube or casing by means of a relatively flexible pneumatic pad held in contact with the work by mechanical means which is conveniently and almost instantaneously arranged in alignment with the patch and instantaneously clamped with the pad in contact therewith, the working or molding pressure being applied immediately thereafter by inflating the pad in contact with the work to any desired predetermined pressure.

The repair apparatus of the prior art, so far as it is known to the trade, is limited as to the means for applying vulcanizing pressure to the work to various types of mechanical clamps including levers, screws and the like, no one of which is capable of exerting a definite predetermined pressure, and no one of which exerts a uniform pressure as between successive operations, and no one of which is capable of exerting the follow-up function whereby uniform pressure is applied continuously to the work, even when there is a yielding action on the part of the work or on the part of some element of the apparatus.

In the repair of casings in accordance with the existing practice, a bag of sand or other finely divided material is pressed against the inside of the casing by mechanical means applying a pressure which is lacking in uniformity as to the different parts of the patch, and which is also lacking in uniformity as to the initial pressure applied and which can not be maintained with any degree of uniformity when there is yielding of the work or of the pad or of other parts of the machine as there is no proper provision for uniform following up of the pressure.

An important feature of the improved repair units is that while they include mechanical means whereby the work may be clamped instantaneously in position immediately it is inserted in the apparatus, they also include a pneumatic device whereby after clamping the work in position, a uniform predetermined continuous pressure is applied to the work and such pressure is maintained throughout the vulcanizing operation uniformly at the predetermined intensity deemed most satisfactory.

In the repair of casings in accordance with the improved practice, there is a heated sectional mold or support for the outside of the casing, these molds or supports being made in sets to fit the various surfaces of the casing and the various different sizes of casings and pads which are an important feature of the invention are, in accordance with the preferred form of the invention, provided in sets, preferably three in a set, to fit the tread portion of the tire, the side wall and the side wall area adjacent the bead, preferably contacting the same on the inside.

The mold sections or supports are preferably formed of metal having a high coefficient of heat conductivity and these are supported on a stove or hot plate or other suitable support, which is preferably heated by steam although any other heating agent may be used and heating of the mold sections may be otherwise accomplished. The proper support being selected and the injured portion of the casing being placed in contact therewith, the injured portion having been first cut away and suitably coated with vulcanizable cement and filled vulcanizable rubber compound and covered with fabric, if fabric is found to be necessary in accordance with the regular practice, the pneumatic pad which is shaped to fit the portion of the casing being repaired, is placed in contact with the inside of the casing over the injured portion and mechanical pressure is applied, preferably by positive means as a screw, or otherwise, the pad is brought in contact with the work and clamped after which air pressure is admitted to the pad from a suitable source of air under pressure and this pressure is maintained uniformly with predetermined intensity for a sufficient vulcanizing period, after which the pressure is released from the pad and the mechanical pressure means being thus relaxed is easily withdrawn so that the casing may be removed.

The tube repair units in the preferred construction shown are of two different types, one being for the purpose of repairing tubes which have been subject to major injuries, so that a section of the tube being removed is replaced by a new section, and the other type being for repairing tubes by patching. The first type of unit comprises a hollow mandrel or sleeve with a longitudinally extending gate through which the tube is passed, being thus enclosed within the mandrel over which the spliced portion is cuffed, bringing it in close contact with the mandrel, the adjacent portion of the tube being turned backward over the spliced portion, and the spliced portion in turn being pressed into close contact with the mandrel by means of a circular hinged clamp or support which carries an annular air bag. The inflation of this bag applies a pneumatic pressure to the external layer of the cuffed tube which is transmitted to the internal layer of the tube comprising and including the splices, holding it in close contact with the heated surface of the mandrel and applying a vulcanizing pressure. The vulcanizing temperature is obtained by the introduction of a supply of steam into the hollow or chamber within the mandrel or in any suitable manner.

This general type of splicer is covered broadly in prior United States Patents Nos. 1,364,362 and 1,311,392.

The other units of this machine, as already suggested, are of the hot plate type, a pneumatic pad of improved construction and arrangement having been combined with the hot plate or flat plate type of heating element.

An important feature of the invention resides in the construction and arrangement, and in the manner of supporting the pneumatic pad, and in the form and arrangement of the cup within which the pad is held and supported, and also in the manner of supporting the cup in pressure-applying relation to the work whereby it is locked instantaneously with the bag in contact with the work with an initial approximate pressure, the admission of air under pressure to the bag giving a definite pressure predetermined with absolute accuracy and of any desired intensity, which pressure is uniformly maintained throughout the vulcanizing operation, and in case of yielding by the work or by any part of the machine, the pneumatic pad has an effective follow-up, giving absolute continuity of uniform vulcanizing pressure as conveniently applied to the work.

In the accompanying drawings we have shown tire and tube repairing apparatus illustrating the embodiment of the various features of our invention in operative form.

In the drawings:

Figure 6 is a fragmentary view corresponding to Figure 5, illustrating the manner of repairing the tread portion of a casing.

Figure 7 is a front view of the apparatus, Figure 5.

Figures 8 and 9 are radial sections through a casing in repair position showing the special pads and cups or supports applied to the side wall of the casing and the area of the casing adjacent the bead.

Figure 10 is a section through the center of a casing at right angles to the axis showing the pad cup or support in top plan and in repair position on the bead area of the side wall.

Figure 11 is a plan of the tread repair cup or pad support in position.

Figure 12 is a section of the tube splicer or section repair unit on line 12 in Figure 1.

Figure 1:
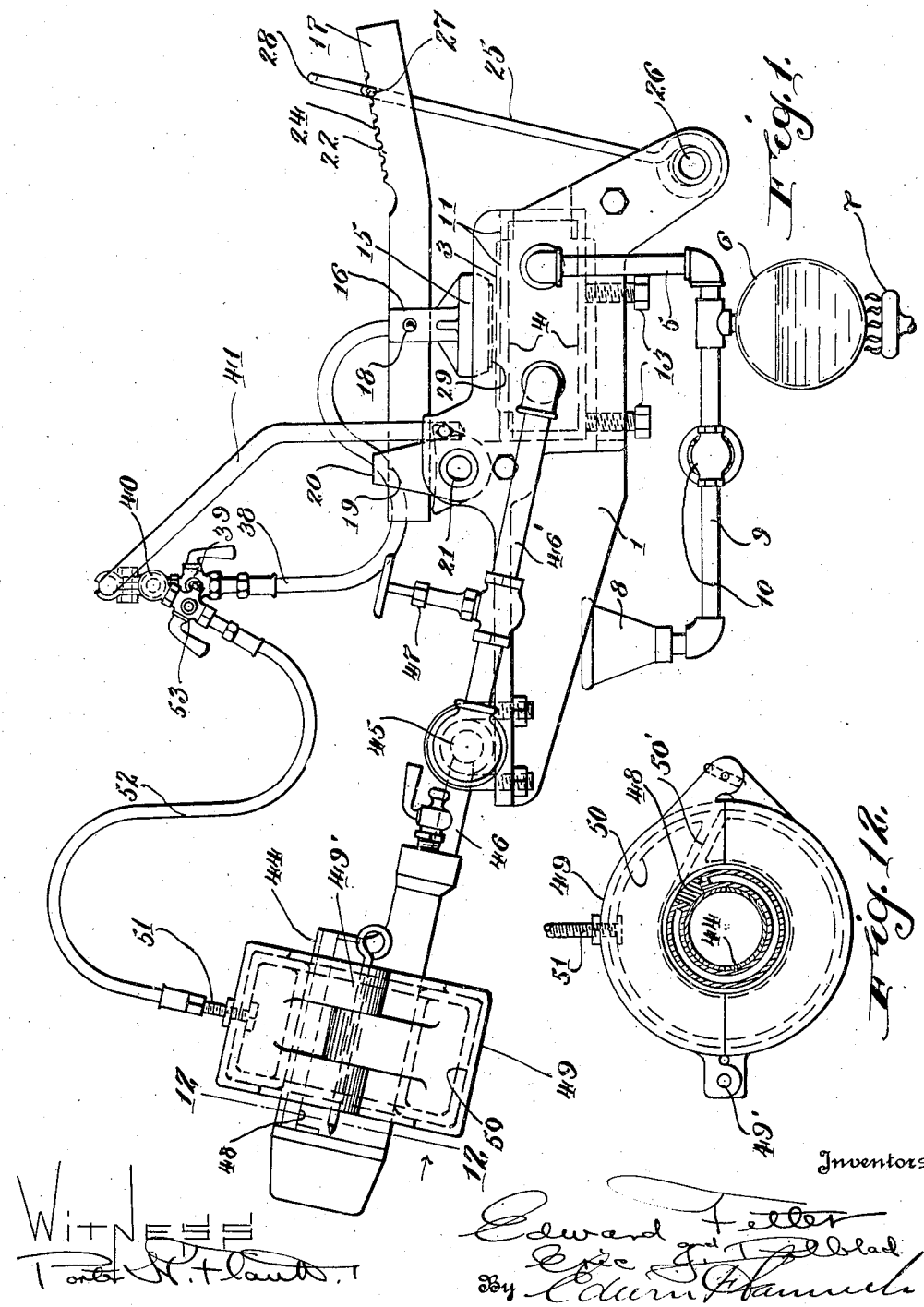
Figure 1 is a side view of this apparatus.
Figure 2:
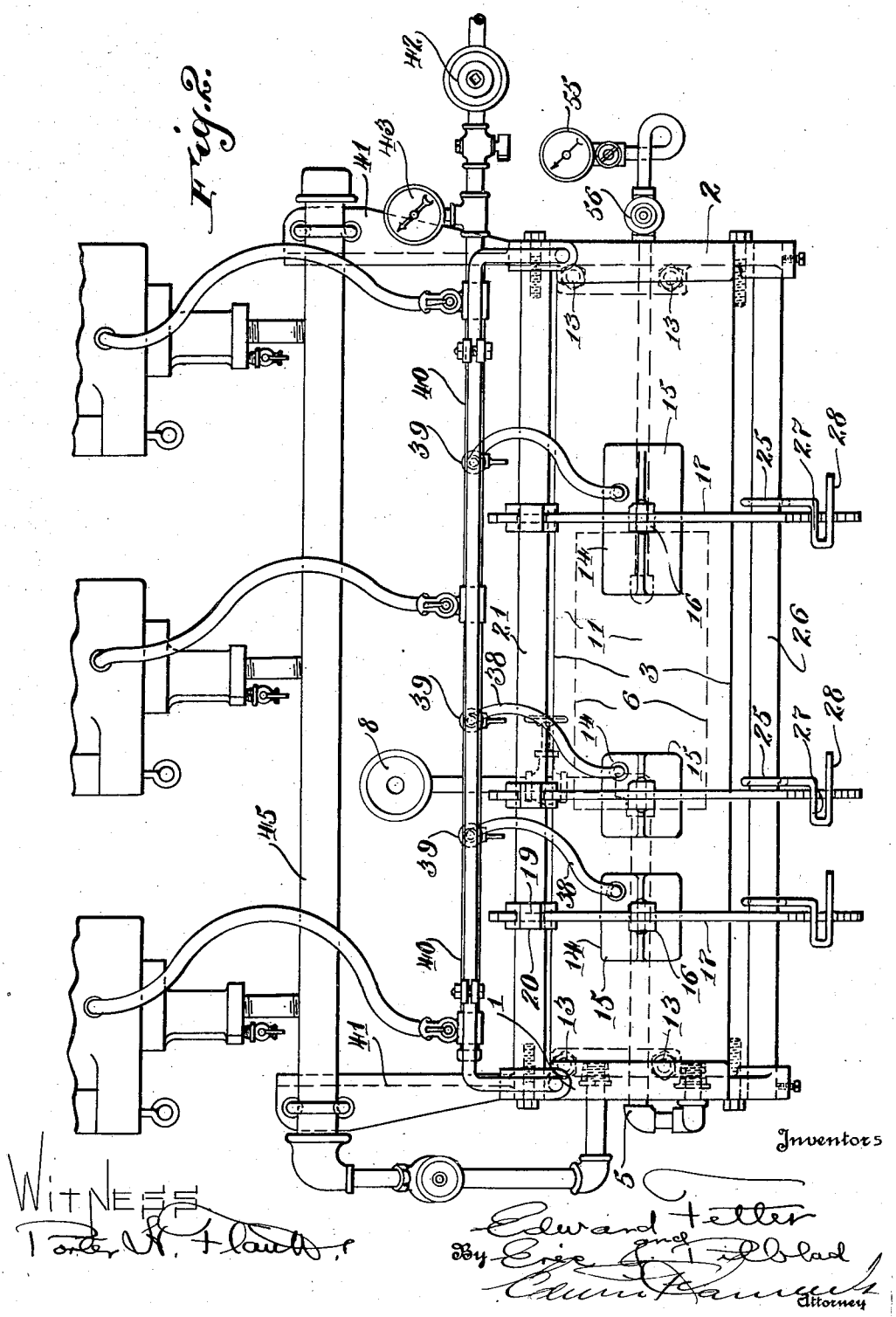
Figure 2 is a top plan.

Referring to the drawings by numerals, each of which is used to indicate the same or similar parts in the different figures, the tube repair apparatus, as shown, Figures 1 and 2, comprises a suitable frame or base 1, supported in any suitable manner, preferably on legs not shown. The base 1 carries thereon a hot plate 3 comprising, in the form of the invention shown, a hollow casting enclosing a steam chamber 4 which is connected in any suitable manner as by means of pipe 5 to a boiler 6 which is heated by means of gas burner 7, or in any suitable manner, the boiler being filled when necessary in any suitable manner by suitable connections exemplified in the present disclosure in the form of a funnel 8 connected to the boiler by piping 9, which may be provided with any suitable valve means 10 to prevent the escape of the steam. The details are being brought out for clearness and not to limit the protection to the form shown.

The hot plate is made adjustable as to its angle with the horizontal by means of set screws 13 seated in the frame and projecting upwardly therefrom beneath the hot plate 3 and this plate presents an upwardly-disposed smoothly finished heating surface 11 on which the tubes to be repaired are placed, the patches composed of vulcanizable rubber compound being turned downwardly against the hot surface 11 which is made very smooth and kept clean to avoid sticking.

Cooperating with the hot plate are a number of pressure members 14 preferably of different sizes, arranged along the length of the plate, as best shown in Figure 2. These pressure members consist each of a downwardly disposed cup 15 provided with an upwardly projecting split shank 16, in which is seated a transverse clamping lever 17, pivotally connected to the shank 16 by a pin 18. The rear end of this lever 17 in the form of the invention shown, is passed through an eye or slot 19 in a hinged lug 20, the lever being slidable freely through the lug in the direction of its length, and the lugs being preferably slidable at right angles to the length of the levers 17 along the transverse shaft 21 on which they are mounted for this purpose. This makes it possible to move the pressure members 14 in any direction relatively to the plate for convenience in bringing it in contact with the work.

In the preferred form of tube repair apparatus shown the forward or handle end of the lever 17, which lever is repeated to correspond with the number of units, is upwardly inclined at 22 and this portion of the lever is preferably notched at 24, providing a series of clamping notches for holding the pressure members 14 including the cup 15 and the pneumatic pad 29 to be further described, in approximate adjusted relation to the work. The levers 17 are held in adjusted or operative position by means of corresponding hooks 25 hingedly mounted at their lower ends on a transverse shaft 26 which extends along the machine frame at the front and below the bottom of the hot plate 3. These hooks are best shown in plan in Figure 2 having a transverse hook portion 27 for engagement with the top of the lever and an upper transverse handle portion or member 28 for engagement by the operator in guiding the hook to clamping position relatively to the corresponding lever 17. In the clamped position the transverse portion 27 of the hook is seated in one of the notches 24, the incline at the end 22 of the lever providing a vertical adjustment which makes it convenient to bring the parts into such relation as to apply sufficient pressure to the work to hold the cooperating members and the work in position prior to the application of pneumatic pressure.

Figure 3:
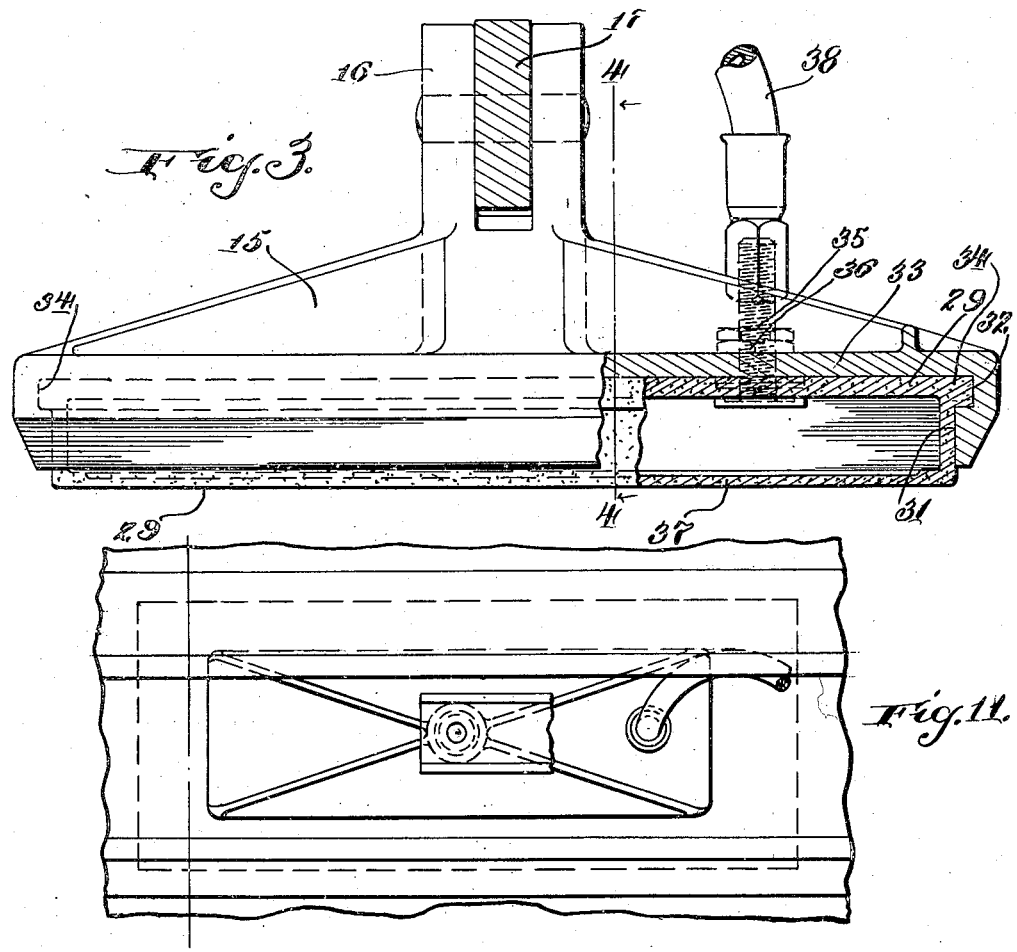
Figure 3 is a front elevation partly in section of a pneumatic pad and cup.
Figure 4:
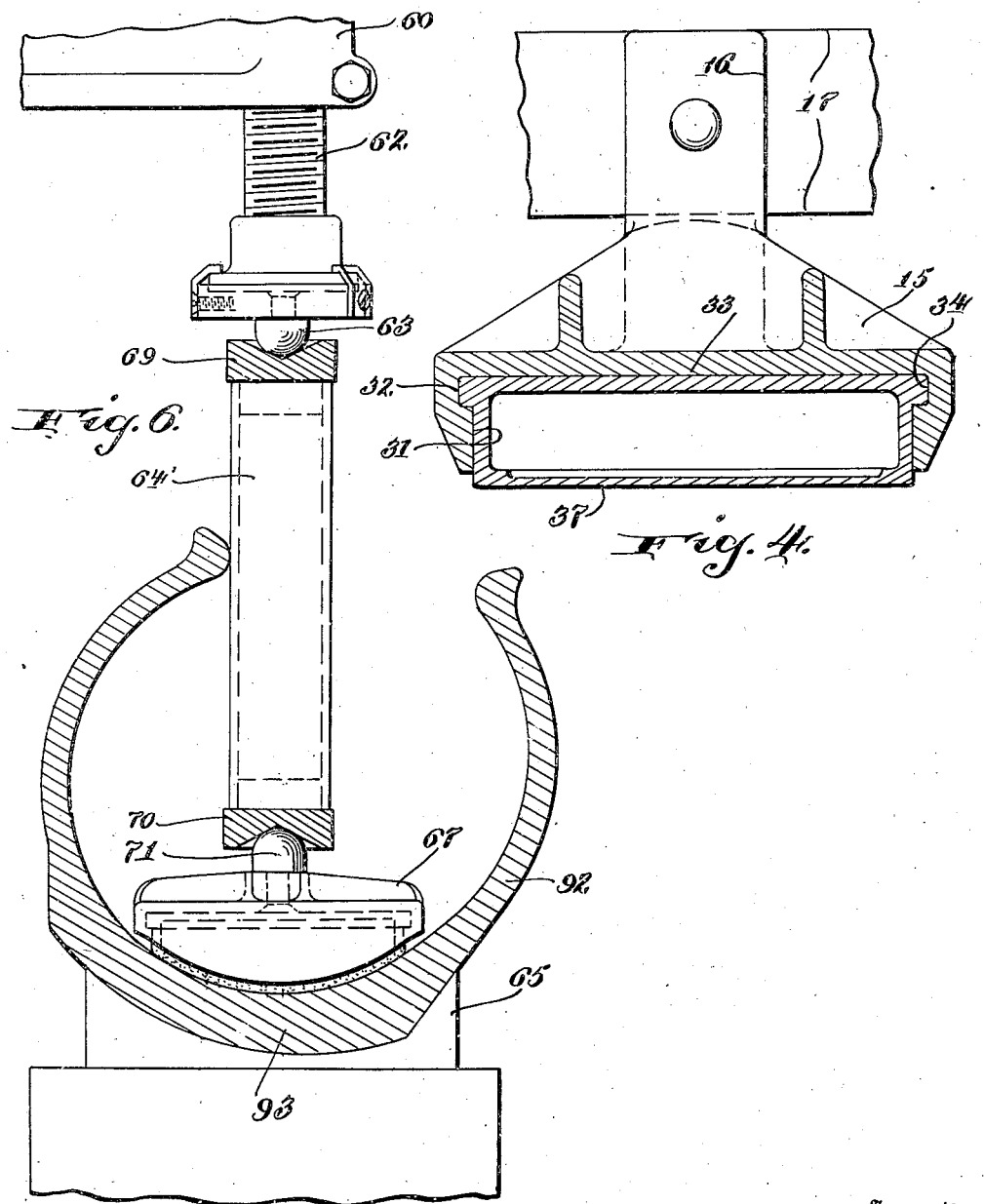
Figure 4 is a section through the same on the line 4, 4 in Figure 3.

Figures 3 and 4 show the pressure cup 15 with the pneumatic pad 29 in position therein. In accordance with the preferred form of the invention, each cup 15, which, as already suggested, is downwardly disposed, i. e., it has the cavity or chamber therein indicated by reference character 31, opening downwardly. The cup is further provided with an under cut 32 or peripheral groove immediately adjacent the top wall 33, which would normally be the bottom of the cup, and the pneumatic pad 29 is provided with a corresponding flange or projecting rim 34 which fits into this groove when the pad is pressed into the cup, holding the pad in operative position. The pad is thus made conveniently removable without any expensive construction necessitating the use of metal or other elements vulcanized to the rubber or any clamps or bolts which might injure the work. The pad is also provided with a valve stem and valve 35 like a tire valve shown as projecting upwardly from the top side of the pad and extending through a suitable opening 36 in the top wall 33 of the inverted cup.

The pads 29 and the cups 15 may be of any suitable size and shape, the pad being preferably flat and smooth as to its bottom or operative surface 27 which is presented toward the work, so that the finished contour of the patch will be likewise flat.

The pneumatic pad 29, which may be referred to as the cup pad or hot plate pad, is connected by way of the valve stem 35 and a suitable tube 38 to a three way valve 39 controlling a suitable outlet from an air pressure main 40 supported on the machine by a suitable upright support 41, as shown in Figures 1 and 2, and connected to any suitable source of air under pressure, the pressure being controlled in the form of the invention shown by a suitable reducing valve 42 and indicated by a gauge 43.

In the operation of the hot plate tube repair unit, the punctured tube, preferably having the puncture duly ground out to form a depression surrounding the injury and if desired coated with vulcanizable cement and having a patch of vulcanizable rubber placed in or covering the depression, is laid on the hot plate surface 11 with the patch turned downwardly against the hot surface 11. The opposite portion of the tube is smoothed out and flattened, and the proper lever 17 carrying a unit 14 including a cup 15 containing a pneumatic pad 29 is moved into registration with the patched portion of the tube by sliding the lug 20 along the shaft 21 until the lever, cup and pad are brought to the right position in the direction of the length of the machine. When it is desired, the lever 17 may be slid in the direction of its length or by sliding the lever through the eye 19 of the lug 20 until the pad 29 is directly over the patch. Then the lever is pressed downwardly and the hook 25 is engaged with the proper notch 24 to hold the lever in approximate adjustment, preferably with the pad in contact with the tube. Then the corresponding three-way valve 38 is opened and the vulcanizing pressure incident to inflation of the pad to the air pressure maintained is thus supplied to the work. The hot plate, being already heated by steam to the desired temperature, as indicated on the steam gauge 55, and further controlled by safety valve 56, the vulcanizing pressure and temperatures are applied and continued through a predetermined vulcanizing period. The pressure is predetermined and maintained constant by the pressure regulator 42, which pressure may be observed and checked by the air gauge 43.

At the end of this period the three way valve is turned to shut off position, when it also releases the pressure from the pad which relieves the strain on the clamping mechanism, so that the hook 25 can be easily disengaged and the cup 15 and pad 29 can be raised by raising the end of the lever 17, when the repaired tube is fully released and may be immediately removed.

The mandrels 44, which are the heating elements of the repair section units, are supported in the form of the invention shown, on the steam manifold 45 at the rear of the machine by means of supply pipes or connections 46, by which the steam is led from the manifold to the respective mandrels. This manifold 45 is in turn connected by a pipe 46 to the steam chamber 4, the supply being controlled by a valve 47. The mandrels are provided with suitable gates 48, further illustrated in United States patent to Fetter, No. 1,364,362, and each mandrel is provided with a hollow annular clamp 49 formed in two halves, hingedly connected at 49' and hollowed out to contain an annular pneumatic pad 50, having a valve stem 51 connected by flexible tube 52 to a three way valve 53 connected to the air pipe 40, but this pad and clamp are longer in the direction of the axis than in the splicer unit, the repair pad and clamp being long enough for two splices, one at each edge of an inserted section.

In the preferred operation of the repair splicer for tubes, the injured portion of the tube is first removed and a corresponding section is inserted, being secured in position by means of vulcanizable cement. This involves two splices which are usually close together. The present splicer differs from that used in the manufacture of new tubes, among other features, in that the mandrel is considerably elongated and the pneumatic clamp is likewise elongated in the direction of the axis providing for the simultaneous vulcanization of two splices one at each end of the insert. The tube thus spliced in a preliminary way is inserted in the mandrel 44 by opening the gate 48 and closing it upon the tube. The spliced portion is then cuffed over the tube as shown in the aforesaid patent, and the adjacent portion being drawn flat, the ring clamp with the annular pneumatic pad 50 split at 50' is applied, encircling the said section which overlies the mandrel. The steam having been admitted to the mandrel by opening the valve 47, the air is admitted to the bag or pad 50 by the three-way valve 53, thus applying a predetermined and definite vulcanizing pressure and vulcanizing temperature to the splice. At the end of the vulcanizing period the valve 53 is closed to cut off the air supply, and by the operation of the three-way valve, the air is at the same time automatically released from the bag, releasing the clamping pressure and permitting the clamp to be unclasped and removed. While the mandrel is best adapted to the vulcanization of inserted sections it may be used for patches of any size and extent.

Figure 5:
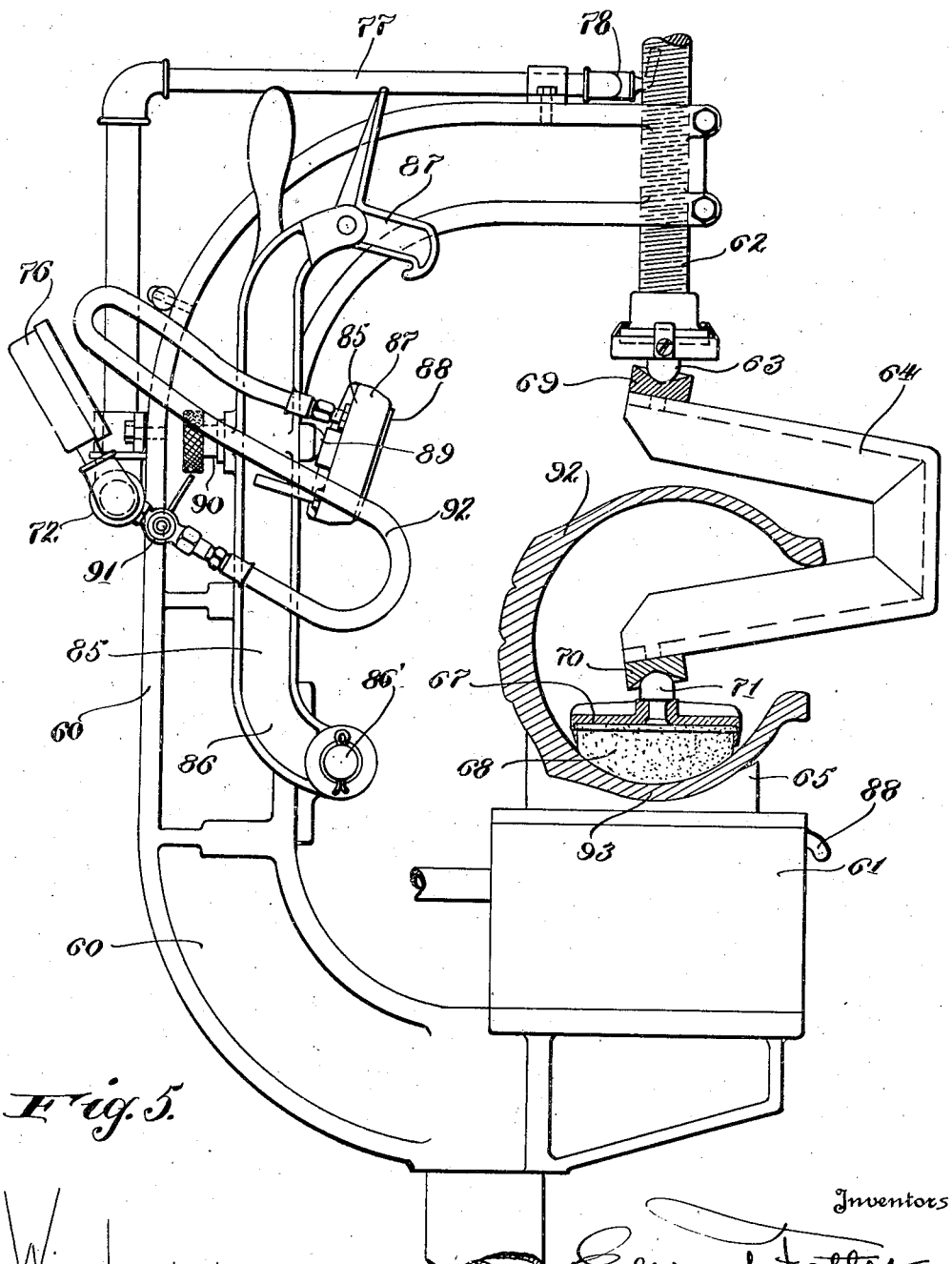
Figure 5 is a side elevation showing a casing repair unit also adapted to include tube repair units, a casing being shown thereon in section in position to illustrate the manner of repairing the side walls of a casing.

Referring now to the casing repair unit shown in Figures 5 to 11, the illustration, Figures 5, 6 and 7, includes a C shaped frame 60, supporting at the lower end of the C a stove, hot plate or heating element 61, and carrying at the upper end of the C suitably threaded through the upper arm of the C a vertical screw shank 62. This screw carries at its lower end one element of a universal joint shown in the form of a hemispherical ball member 63, whereby pressure is communicated to a strut 64 which may be of any convenient form either U shaped to reach the side wall of the casing as shown in Figure 5, or rectilinear to apply pressure directly to the tread portion of the casing at 64', Figure 6, or the member 64 may by rotating it into the radial plane of the casing, be used to apply pressure to the tread portion as well as the side wall.

The illustration also includes a sectional mold or support 65 shaped to suit the outside of the casing, preferably to suit the particular portion of the casing being repaired, the same being to the best advantage provided in a plurality of sets for each group of sizes. The illustration further includes a pad support or cup 67, which is preferably shaped to conform in plan to the particular portion of the casing being repaired.

The pad cups or supports, 67, 67', 67'' are shaped to the different portions of the casing to be treated, and the pads 68, 68' and 68'' therein are likewise shaped to fit the particular portions of the casing to which they are to be applied, there being preferably, as already pointed out, a set of three cups or supports and three pads for each group of casing sizes to be treated.

As best shown in Figures 5 and 6, the struts 64, 64' are preferably provided at their opposite ends with oppositely disposed universal joint member 69, 70, each of which is shown in the form of a socket, one being adapted to cooperate with and receive the ball 63 which is suitably and preferably removably secured to the lower end of the pressure screw 62, and the other socket member 70 being adapted to receive and cooperate with a corresponding universal joint member shown in the form of a ball member 71, which is mounted on the top of the pad support or on cup 67, 67', 67'', substantially at the center of the same and upwardly disposed whereby the pressure of the screw is applied to the support and the pneumatic pressure exerted by and through the pad is in turn applied to the screw and to the work, the pressure in the latter direction being the working pressure, and the opposite pressure the reaction.

The illustration also includes an air supply pipe 72 suitably mounted on and connected to the frame. This air supply pipe 72 is connected to a source of air under pressure in any suitable manner as by means of a flexible connection or hose or otherwise at 73. Adjacent this connection is a pressure reducing valve 74 and a shut off valve 75, and a pressure gauge 76. In the form of the invention shown the pipe 72 may be referred to as a manifold having a delivery or outlet pipe 77 extending to the top of the C frame 60 where the air supply is connected preferably by way of a three way valve 78 to the flexible pipe or hose 79 which is in turn connected by way of a three way valve 78 to the flexible pipe or hose 79 which is in turn connected by way of a nipple 80 to the pneumatic pad or bag 68, 68', etc.

Figure 5 shows, in addition to the casing repair features already described a plurality of tube repair units somewhat similar to those described in connection with Figures 1 and 2. Each tube repair unit 85 includes a lever 86 pivotally mounted at 86' on the vertical arm of the C frame 60, to swing in a vertical plane toward and from the top of the hot plate or stove 61. At the end of each said lever is a hook clamp 87, adapted to engage suitably cooperating clamping means 88 at the front of the hot plate, and this lever 86 carries mounted on the side thereof, which is downward in its horizontal or clamping position and intermediate thereof, a pad cup 87 carrying a pneumatic pad 88 similar to the pad 29, Figure 3, the cup being preferably mounted on a universal joint 89 on the lower end of a pressure screw 90 which is threaded through the lever arm 86.

The pad 88 is supplied with air under pressure from the manifold 72 by way of a three way valve 91 and hose 92.

The operation of the tube repair units 85 is similar to that described in connection with Figures 1 and 2, except that when the lever 86 is swung downward to bring the pad into contact with the tube on the hot plate 61, and clamped by means of the clamping hook 87, it may be further adjusted into close contact with the portion of the tube to be repaired by means of the adjusting screw 90, after which the three way valve 91 is opened to apply a uniform predetermined pressure to the entire surface of the tube which is in contact with the pad, the pressure and temperature being maintained uniformly at the predetermined intensity throughout the vulcanizing period.

In the operation of vulcanizing casings, the casing is first treated to remove the fragmentary edges of the injured portion and to admit the repair materials. The surface of the repair is then coated with vulcanizable cement and filled with vulcanizable rubber compound, portions of fabric being applied in accordance with the regular practice when this is deemed necessary, the same being suitably covered with portions of vulcanizable rubber compound. These repair materials may be applied both internally and externally according to the nature of the injury, and the dictates of the practice. A suitable support or mold section 65, 65', 65'', Figures 5, 8 and 9, having been selected, it being understood that the same are provided of heat conducting material, the casing 92 is placed with the injured portion 93 concentric with the support and also with its center as nearly as possible in line with the pressure screw 62. A pad 68 in the preferred practice conforming substantially to the inside of the casing at this point, the same being suitably enclosed within a pad support or cup 67, is placed in registration with the injured portion thus made ready for repair and the screw 62 is so manipulated to enable the operator to place the strut 64 in position as illustrated in Figures 5 and 6 with the universal joint members 63, 69 of the screw 62 and the strut 64 in cooperation at the upper end of the strut, as shown in Figures 5 and 6, the universal joint members 70 and 71 of the strut and the cup 67 being likewise placed in cooperation at the lower end of the strut, and the screw being turned downwardly to an extent sufficient to hold the parts in assembled relation. The air hose 79 is connected by the nipple 80 to the pad, the three way valve 78 is opened to apply the molding or vulcanizing pressure of the air to the work by expanding the pad. The hot plate or stove 61 has been previously raised to a temperature which will be designated as the vulcanizing temperature, such heating being accomplished by any suitable heating units 95 which may be either gas burners or electricity or any suitable heating agent. At the end of the period of vulcanization, the three way valve 78 is turned to shut off the air pressure and as already described, in this position the valve is opened so that the air is released from the pneumatic pad 68 and a tube is easily removed by twirling the pressure screw 62 in the opposite or unscrewing direction.

It is of particular interest that while the pneumatic pads 68, 68', 68'' conform in a general way to the inside of the casing as selected when originally placed in position, and on application of the air pressure it conforms exactly to the casing, it also serves by means of the connection of the pad to the air pressure, which is preferably maintained throughout the operation to apply a continuous uniform pressure as predetermined, and this pressure is maintained uniformly throughout the operation so that there is no relaxation of the pressure due to yielding of the work or by any chance to yielding of the mechanical portions of the apparatus, and this pressure is attained with absolute accuracy at the intensity fixed upon as most favorable to the performance of a perfect job.

It is also of interest as an improvement over the prior apparatus that by the operation of the mechanical elements an initial approximate pressure is applied to the work to hold the parts in operative position and thereafter an exact uniform predetermined pressure is applied by the admission of air to the pad from a pressure source, and that the pressure thus applied is maintained uniformly with complete follow up, giving uniform pressure even if there is yielding of the work, which function is lacking in all previous apparatus for this purpose. It will be understood that in cases where the pad is filled with air under pressure and the supply connection is removed or closed off by any means as an ordinary tire valve, the heating of the vulcanizer tends to increase the pressure in the pad, but this increase of pressure as distinguished from a reduction of pressure, does not interfere with the vulcanizing operation. It, in fact, has the tendency to increase the density of the patch or other vulcanize and hence to improve its wearing qualities. Where uniform pressure is referred to in the claims, it is to be understood that such an increase of the pressure is contemplated and is an obvious and sometimes necessary incident to the use of the apparatus under existing conditions.

We have thus described specifically and in detail a casing and tube vulcanizing apparatus embodying the features of my invention in the preferred form, in order that the manner of constructing, operating and using the apparatus may be fully understood, however, the specific terms herein are used descriptively rather than in a limiting sense, the scope of the invention being defined in the claims.

What we claim as new and desire to secure by Letters Patent is:

1. The combination in a repair unit for the outer shoes or casings of pneumatic tires, of a rigid support conforming to the surface of the casing as to a limited area corresponding to the repair, a pneumatic pad adapted to engage the opposite side of the casing covering a corresponding area and adjustable means for supporting the pad adjacent the casing applying an initial pressure to the work and means for inflating the pad to apply a predetermined vulcanizing pressure to the area to be repaired.

2. The combination in a repair unit for pneumatic tires by vulcanization of a rigid support conforming to the surface of the member to be repaired as to a limited area corresponding to the maximum area to be repaired, a pneumatic pad adapted to engage the opposite side of the work covering a corresponding area, adjustable means for supporting the pad in contact with the work, applying an initial pressure thereto, and means for inflating the pad to compress the work between the support and the pad, applying a predetermined vulcanizing pressure thereto, said inflating means comprising a continuous supply of fluid under pressure, causing the pad to follow up and remain in operative contact with the work throughout the operation avoiding loss of pressure due to leakage, contraction or yielding of the mechanical structure which supports the work and the pad.

3. A spot vulcanizing unit for inner tubes or casings of pneumatic tires comprising a support of heat conducting material of a limited area adapted to engage the portion to be repaired from one side, means for heating the same to vulcanizing temperature, and maintaining this vulcanizing temperature, an inflatable pad, the pad being of an area corresponding to the vulcanizing area, means for holding the same in operative position at the opposite side of the work from said support to hold the work in position, means for inflating the pad and maintaining pressure therein, the pad support including a cup having an undercut portion, the pad having a projecting portion to fit the undercut to hold it in the cup.

4. A spot vulcanizing unit for inner tubes or casings of pneumatic tires comprising a support of heat conducting material adapted to engage the area to be treated from one side, means for heating the same to vulcanizing temperature, and maintianing this vulcanizing temperature, a pneumatic pad, the pad being of an area corresponding to the repair, means for supporting the same in contact with the opposite side of the work, and applying initial pressure to the work to hold it in position, means including a supply of fluid under pressure for inflating the pad and maintaining a pressure which substantially equals the pressure of the supply therein throughout the operation, the pad support including a cup, the cup having a peripheral groove and the pad having a corresponding rib fitting in the groove to hold the pad in the cup.

5. In an apparatus for repairing inner tubes and casings of pneumatic tires by vulcanization a support of heat conducting material for one side of the work, means for heating the support, a cup for a pneumatic pad, a pad in said cup, means for supporting the cup with the pad engaging the side of the work opposite the heated support, the cup having universal pressure receiving means opposite the pad, pressure applying means spaced away from the cup and having a corresponding pressure member, a removable strut to be inserted between the pressure applying means and the cup, said strut having universal means at its opposite ends adapted to receive and engage said pressure members.

6. The combination in a repair unit, for the casing or tubes, of the type described, of a heat conducting support and means for heating the support to apply vulcanizing temperatures to the work, a pneumatic pad of a limited area corresponding to the repairs, a hollow support partially enclosing the pad and carrying the same, means for clamping the hollow support and the pad in operative relation to the work, means for maintaining a supply of fluid under pressure connected to the pad, said connection including valve means whereby the fluid under pressure is admitted to the pad and discharged therefrom, the fluid pressure supply being cut off, by the operation of the valve means at the time of discharge, the fluid pressure supply serving to apply a predetermined vulcanizing pressure to the work and maintain it uniformly through a period within the definite control of the operator.

EDWARD FETTER.
ERIC J. PILBLAD.